United States Patent [19]

Ando

[11] 4,137,997
[45] Feb. 6, 1979

[54] LUBRICATING AND COOLING SYSTEM FOR SPINDLE BEARING ASSEMBLY

[75] Inventor: Shigenori Ando, Narashino, Japan

[73] Assignee: Seiko Seiki Kabushiki Kaisha, Japan

[21] Appl. No.: 824,314

[22] Filed: Aug. 12, 1977

[30] Foreign Application Priority Data

Aug. 13, 1976 [JP] Japan .................... 51-108679[U]
Aug. 13, 1976 [JP] Japan .................... 51-108680[U]

[51] Int. Cl.² .................... F16N 17/02; F16C 1/24
[52] U.S. Cl. .................... 184/6.22; 308/187
[58] Field of Search .................... 184/6.22, 6 R, 104 R; 308/187

[56] References Cited

U.S. PATENT DOCUMENTS

| | | | |
|---|---|---|---|
| 2,374,639 | 4/1945 | Miller | 184/6.22 X |
| 2,664,173 | 12/1953 | Karig | 184/104 R |
| 3,042,462 | 7/1962 | Rosskopf | 308/187 |
| 3,729,064 | 4/1973 | Wolf et al. | 184/104 R X |
| 4,006,944 | 2/1977 | Ando et al. | 184/6.22 X |

*Primary Examiner*—David H. Brown
*Attorney, Agent, or Firm*—Robert E. Burns; Emmanuel J. Lobato; Bruce L. Adams

[57] ABSTRACT

A lubricating and cooling system for a spindle bearing assembly in which the spindle is rotatably mounted in bearings in a closed spindle housing comprises means for supplying lubricating oil to the bearings and cooling oil to the bearings and spindle, the lubricating admission passages and cooling oil admission passages being separate from one another and being supplied from separate lubricating oil and cooling circuits so that the lubricating and cooling are controlled individually and selectively.

10 Claims, 1 Drawing Figure

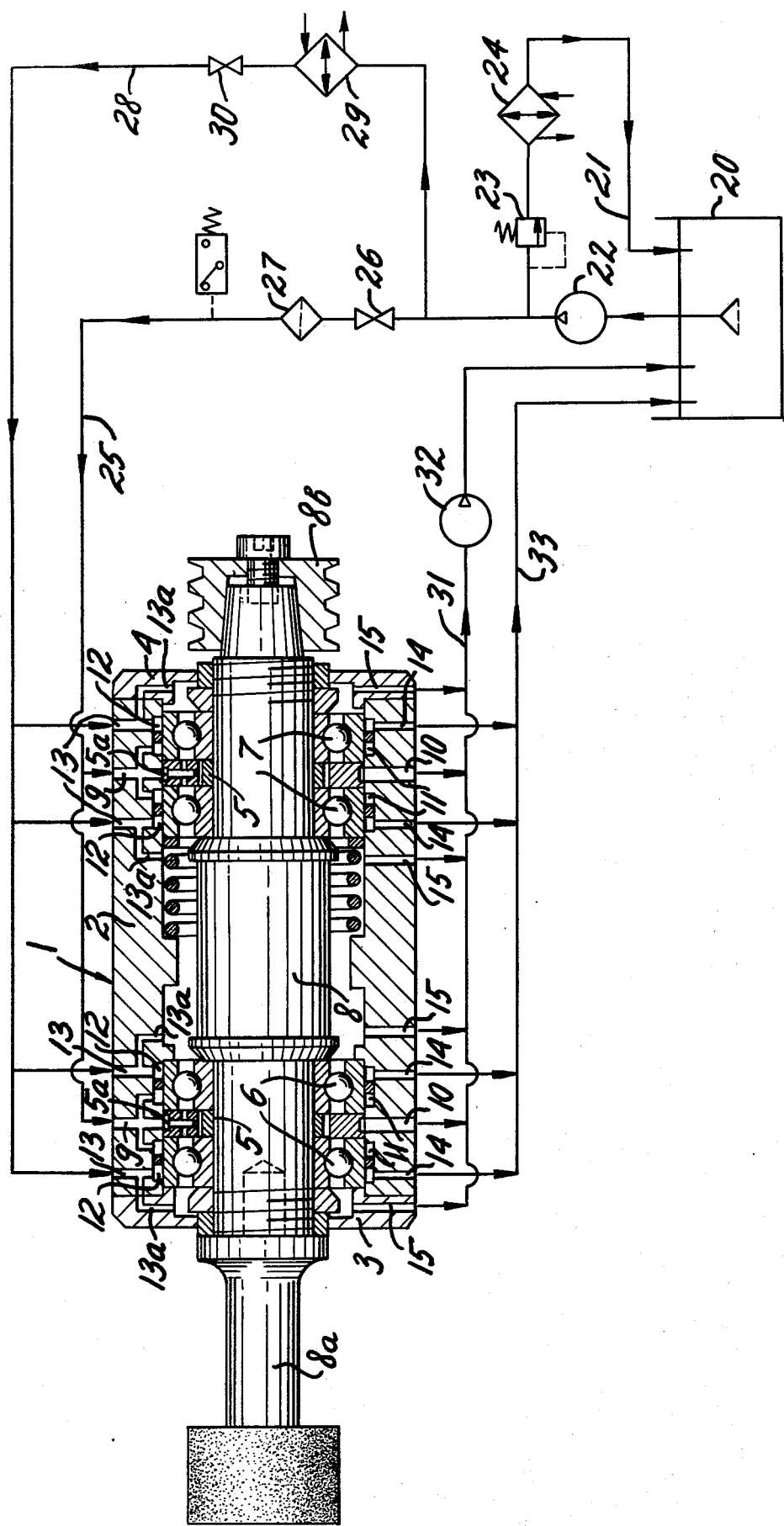

LUBRICATING AND COOLING SYSTEM FOR SPINDLE BEARING ASSEMBLY

FIELD OF INVENTION

The present invention relates to means for lubricating and cooling a spindle bearing assembly such as is used for the grinding wheel spindle of an internal grinding machine.

BACKGROUND OF THE INVENTION

Known lubricating systems for spindle bearing assemblies include one which is called oil-mist lubrication wherein lubricating oil is atomized and delivered to the spindle bearing with compressed air and one which is called oil-jet lubrication wherein pressurized lubricating oil is directed onto the spindle bearing at high speed. In these lubricating methods the lubricating and cooling of the spindle bearing is generally carried out at the same time through the flow of the lubricating oil. However, in the oil-jet lubrication, the lubricating oil is directed onto the spindle bearing at such high speed that mechanical losses such as friction resistance in the sliding portion of the spindle bearing or viscous resistance of the lubricating oil are developed. This mechanical loss is especially developed by the high speed of the grinding wheel spindle of a cylinder grinding machine. Therefore, the less volume of lubricating oil supplied in order to reduce the mechanical losses, the worst the heat absorption becomes. Accordingly the spindle bearing is apt to be subjected to the danger of heating up. On the other hand, the greater the volume of the jetted lubricating oil in order to improve the cooling effect the greater such mechanical loss becomes. There is thus a mutually inconsistant drawback between the cooling and the lubricating through the volume of the jetted lubricating oil so that it is difficult to control both the cooling and lubricating at satisfactory levels.

SUMMARY OF THE INVENTION

It is an object of the present invention to remove these drawbacks and to provide a lubricating system wherein an oil feeding circuit for lubricating and a cooling oil circuit for cooling are separately constructed and controlled so that the lubricating and cooling of the spindle bearing may be carried out more effectively. In the lubricating system of the spindle bearing according to the present invention, a part of the lubricating oil which is supplied to the spindle bearing is cooled more for the cooling oil and the cooled oil is supplied to the spindle bearing so that the lubricating and cooling in the spindle bearing system may be carried out more effectively.

BRIEF DESCRIPTION OF THE DRAWING

The nature, objects and advantages of the invention will be more fully understood from the following description of a preferred embodiment shown by way of example in the accompanying drawing which is an axial section of a spindle bearing assembly with lubricating oil and cooling oil circuits shown schematically.

DESCRIPTION OF PREFERRED EMBODIMENT

In the drawing there is shown a grinding wheel spindle assembly provided with a lubricating and cooling system in accordance with the present invention. The spindle wheel assembly comprises a closed type spindle housing 1 comprising a spindle housing body 2, a front cover 3 and a rear cover 4. In the neighborhood of opposite ends of the spindle housing double row ball bearings 6 and 7 are provided spaced by distance collars 5. A spindle 8 having a grinding wheel spindle 8a at one end and a pulley 8b at the other end is rotatably mounted in the ball bearings 6,7. The spindle housing body 2 is provided with admission ports 9 for lubricating oil. The lubricating oil which is fed from these admission ports passes through peripheral grooves 5a formed along approximately a half circle of the distance collars 5 and is thereby directed into the inside of the ball bearings 6,7. The oil is exhausted from exhaust holes 10 and 15.

Peripheral grooves 11 are formed in the spindle housing around the circumferential surface of the outer race of each of the ball bearings 6 and 7 and these peripheral grooves 11 are connected with the admission ports 9. The lubricating oil introduced from the admission ports 9 bears on each ball bearing 6,7 with a static pressure. Around each of the bearings 6,7 there is also formed in the spindle housing a circumferentially extending peripheral groove 12. Cooling oil admission ports 13 provided in the spindle housing body 2 are connected with the circumferentially extending peripheral grooves 12 which are formed along the circumferential surfaces of the ball bearings 6,7. The cooling oil supplied through the admission ports 13 flows through the circumferentially extending peripheral grooves 12 to cool the ball bearings 6,7 and is discharged through exhaust holes 14. Also the admission ports 13 are provided with branch passages 13a which deliver cooling oil to the outer sides of the ball bearings 6,7 so that the cooling oil is showered onto the spindle 8 so as to cool it and is discharged through exhaust holes 15.

The system for supplying lubricating oil and cooling oil to the spindle bearing comprises a tank 20 in which the lubricating oil and the cooling oil are stored. The temperature of the oil in the tank 20 is controlled by an oil cooling circuit 21. The oil in the tank is fed out by a feed pump 22 and is passed through a relief valve 23 for controlling the pressure thereof and a cooling device 24 for cooling the oil which is then returned to the tank 20 so that the oil temperature in the tank 20 can be kept at a constant value. A lubricating oil circuit 25 which is divided off of the oil cooling circuit 21 supplies lubricating oil to the admission ports 9. In the lubricating oil circuit 25 a part of the oil from the tank 20 is fed by the pump 22 and is controlled by a flow control valve 26 and passed through a filter 27 to the lubricating oil admission ports 9.

A cooling oil circuit 28 branches off of the lubricating oil circuit 25. The cooling oil circuit 28 comprises a cooling device 29 and a flow control valve 30. Thus a part of the oil from the tank 20 is fed out by the feed pump 22, is cooled through the cooling device and the cooling oil is led to the cooling oil admission ports 13. The exhaust holes 10 and 15 of the spindle housing deliver oil into a waste oil recovery passage 31 which returns it to the tank 20.

A part of the lubricating oil which is fed to the lubricating oil admission ports 9 and a part of the cooling oil which is led to the cooling oil admission ports 13 is exhausted to the oil recovery passage 31 to be returned to the tank 20 by a pump 32. A waste oil recovery passage 33 receives oil from exhaust holes 14 in the spindle housing. Thus the cooling oil which is led from the oil admission ports 13 to the circumferentially extending peripheral grooves 12 formed on the circumferences of the ball bearings 6,7 is exhausted by the feeding pressure and delivered to the recovery passage 13 by which it is returned to the tank 20.

When the spindle 8 is rotated at high speed by non-illustrated driving mechanism and the feed pumps 22 and 32 are driven, the oil in the tank 20 is circulated and cooled through the oil cooling circuit 21 and is fed forcibly into the lubricating oil circuit 20 and the cooling oil circuit 28. The lubricating oil which is fed into the lubricating oil circuit 25 passes through the lubricating oil admission ports 9 and distance collars 5 and is delivered to the ball bearings 6,7 at high speed in order to lubricate the ball bearings. A part of the lubricating oil which is fed to the lubricating oil circuit 25 is fed forcibly to the peripheral grooves 11 formed on the circumferences of the the ball bearings 6,7 and subjects the ball bearing 6,7 to a static oil pressure. On the other hand, the oil which is fed into the cooling oil circuit 28 is further cooled by the cooling device 29 and the cooling oil passes through the cooling oil admission ports 13 and is fed into the circumferentially extending peripheral grooves 12 formed on the circumferences of the ball bearings 6,7 so that the ball bearings 6,7 are cooled outwardly.

Moreover, the cooling oil is directed by the branch admission holes 13a to both sides of the bearing so as to be directed onto the spindle 8 and thereby cool the spindle. The lubricating oil which is fed into the circumferentially extending grooves 5a of the distance collars 5 is passed through the exhaust holes 10,15 and into the waste oil recovery passage and is returned by the pump 32 to the tank 20. Accordingly lubricating and cooling oil which are recovered in the tank 20 is cooled through the oil cooling circuit for the next use.

As mentioned above in the lubricating system, the lubricating oil stored in the storage tank 20 is cooled by the oil cooling circuit 21 and a part of the oil is delivered to the spindle bearing device to lubricate it. Also a part of the oil from the tank 21 is further cooled by another cooling device and is delivered to the lubricated portion of the spindle bearing device to cool it. Accordingly the volume of lubricating oil and cooling oil is controlled individually by the control valves 26 and 30 so that the spindle bearing and the spindle itself can be effectively lubricated and cooled while eliminating mechanical loss. Moreover, as clearly shown in the drawing, when the cooling oil is directly led to the central portion of the spindle between the bearings, the spindle is wholly cooled by heat transmission from the central portion of the spindle to the cooling oil so that heat expansion of the spindle can be eliminated and the life of the spindle bearing thereby improved. The invention is thereby made much more effective.

What is claimed is:

1. A lubricating and cooling system for a spindle bearing assembly comprising a closed spindle housing, axially spaced spindle bearings in said housing and a spindle rotatably supported by said bearings, said housing having separate admission ports for supplying lubricating oil and cooling fluid to said bearings, said system comprising means for supplying lubricating oil under pressure to said lubricating oil admission ports, means for cooling cooling fluid and supplying said cooled cooling fluid to said cooling fluid admission ports and means for individually controlling the rate at which said lubricating oil is supplied to said lubricating oil admission ports and the rate at which cooling fluid is supplied to said cooling fluid admission ports.

2. A lubricating and cooling system according to claim 1, in which said spindle housing has exhaust ports for exhausting said lubricating oil from said spindle housing and separate exhaust ports for exhausting said cooling fluid from said spindle housing.

3. A lubricating and cooling system according to claim 1, in which said cooling fluid admission ports connect with passages provided in said housing to direct cooling fluid to the ends of said bearings and onto said spindle at the ends of said bearings to cool said spindle.

4. A lubricating and cooling system according to claim 1, in which said bearings are spaced by spacing rings having passages communicating with at least some of said lubricating oil admission ports and disposed to direct lubricating oil to the interior of said bearings.

5. A lubricating and cooling system according to claim 4, in which said spindle housing has circumferentially extending inner peripheral grooves surrounding said bearings and communicating with at least some of said lubricating oil admission ports to apply static oil pressure to the peripheries of said bearings.

6. A lubricating and cooling system for a spindle bearing assembly comprising a closed spindle housing, axially spaced spindle bearings in said housing and a spindle rotatably supported by said bearings, said housing having separate admission ports for supplying lubricating oil and cooling oil to said bearings, said system comprising:
   a tank in which said lubricating and cooling oil is stored,
   means for cooling the oil in said tank,
   a lubricating oil circuit for delivering a portion of said oil from said tank to said lubricating oil admission ports under pressure,
   a cooling oil circuit for further cooling a portion of oil from said tank and delivering said cooled oil to said cooling oil admission ports, and
   separate flow control means in said lubricating oil circuit and said cooling oil circuit for individually controlling the rate at which said oil is delivered to said lubricating oil admission ports and the rate at which said further cooled oil is delivered to said cooling oil admission ports.

7. A lubricating and cooling system according to claim 6, further comprising a waste oil recovery circuit for returning lubricating oil and cooling oil from said spindle bearing assembly to said tank.

8. A lubricating and cooling system according to claim 6, in which said means for cooling the oil in said tank comprises an oil cooling circuit including a pump for withdrawing oil from said tank, a pressure relief valve for regulating pressure, a cooling device for cooling oil passing through it and a passage for returning the cooled oil from said cooling means to said tank.

9. A lubricating and cooling system according to claim 6, comprising a common pump for withdrawing oil from said tank and delivering said oil to both said lubricating oil circuit and said cooling oil circuit.

10. A lubricating and cooling system according to claim 6, in which said bearings are spaced by distance rings having passage means for directing lubricating oil to the interior of said bearings, and in which said cooling oil admission ports comprise means for directing cooling oil to the exterior and ends of said bearings and onto said spindle at the ends of said bearings.

* * * * *